June 17, 1969 F. B. BOYLE 3,450,951
OUTDOOR ELECTRICAL METER BOX AND SERVICE OUTLET FOR MOBILE HOMES
Filed July 12, 1967 Sheet 1 of 2

INVENTOR.
Francis B. Boyle
BY
ATTORNEY.

June 17, 1969 F. B. BOYLE 3,450,951
OUTDOOR ELECTRICAL METER BOX AND SERVICE OUTLET FOR MOBILE HOMES
Filed July 12, 1967 Sheet 2 of 2
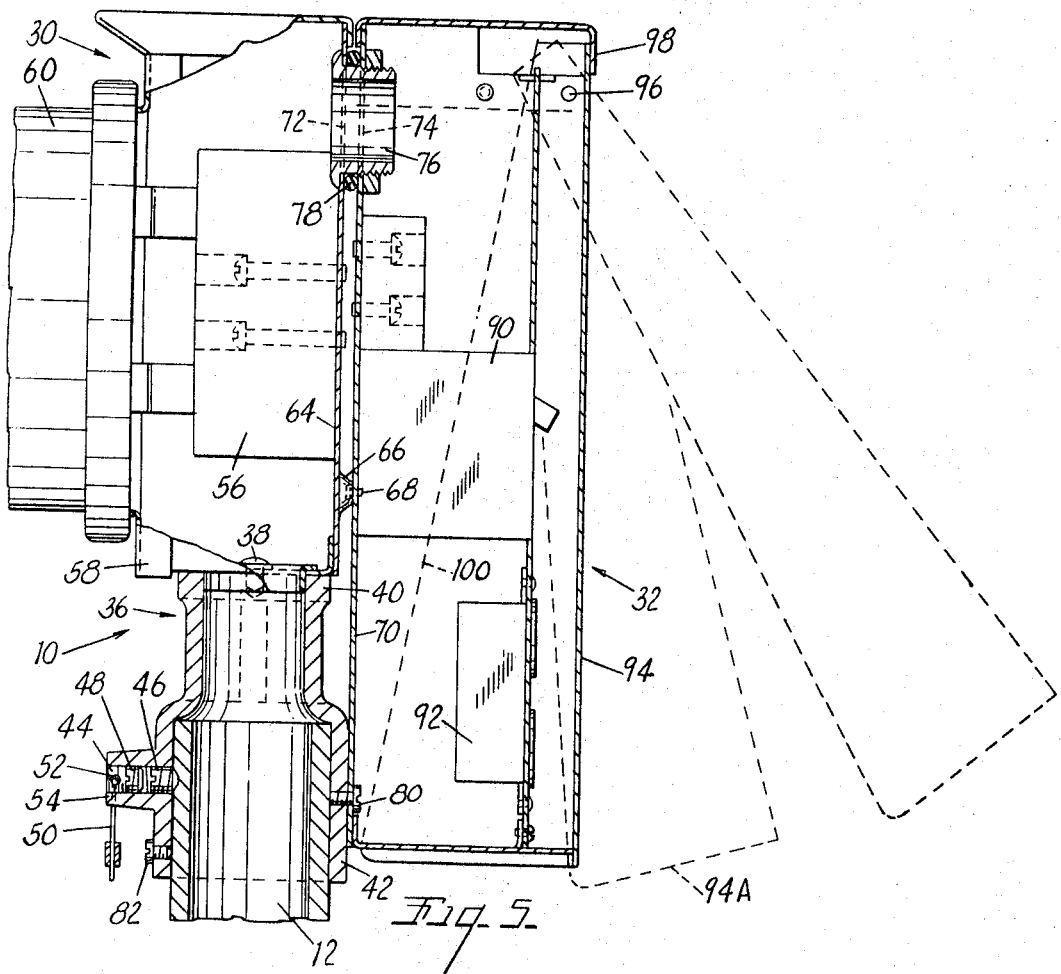
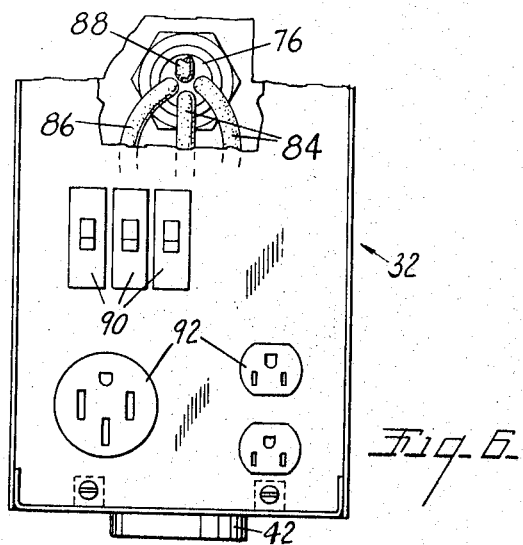
INVENTOR.
Francis B. Boyle
BY
ATTORNEY.

United States Patent Office 3,450,951
Patented June 17, 1969

---

3,450,951
OUTDOOR ELECTRICAL METER BOX AND SERVICE OUTLET FOR MOBILE HOMES
Francis B. Boyle, 3307 S. Westnedge Ave., Kalamazoo, Mich. 49001
Filed July 12, 1967, Ser. No. 652,774
Int. Cl. H02b 1/14, 9/00
U.S. Cl. 317—105                    8 Claims

ABSTRACT OF THE DISCLOSURE

A box having a meter socket and power line connections therein, a hollow cylindrical base secured to the bottom of the box by screws accessible only from within the box, the base communicating with the box and having a tamper proof mechanical connection engageable with a support that encloses power supply wires, and an electrical service outlet box connected to the back of the meter box by screws accessible only from within the meter box, the meter box and outlet box having registering openings formed through their adjacent back walls for passage of wires from the meter socket into the outlet box, and a weather seal between the backs of the boxes and around the holes, the outlet box having an open front side with a weather shedding cover hinged to the top of the box.

Outline of invention

The invention resides in the combination of an electrical service outlet box connected back to back with a meter socket box with a weatherproof and access limiting passage for wires from the metered side of a meter socket in the meter box to service outlet elements in the outlet box. The mechanical connections between the two boxes are accessible only from within the meter box. A hollow mounting base and power wire inlet is connected to the bottom of the meter by connections accessible only from within the meter socket box. The base is adapted to be supported on a tubular conduit from which the unmetered power lines extend into the meter socket box. A tamper proof mechanical connection or seal prevents unauthorized access to the power leads.

The combination is adaptable to power line distribution systems for mobile home parking areas, where the individual load centers for each mobile home are of the termination type, or of the loop type in which the main power supply wires are looped up from a buried cable at each load center. The unmetered portions of the supply wires are enclosed and protected against unauthorized connections being made thereto, while the metered side of the power wires is freely accessible for connection thereto as desired by the customer. Ample provision for safety grounding connections for both the normally grounded neutral wire of a power supply system and for an appliance and trailer frame is available and easily accessible.

Description

The drawings, of which there are two sheets, illustrate two alternative mountings for the combined meter box and service outlet box; and a preferred form of the box combination and support.

FIGURE 5 is a vertical cross sectional view taken along the plane of the line 5—5 in FIGURE 3.

FIGURE 6 is a fragmentary rear elevational view of the inside of the service outlet box.

Parking areas or communities for mobile homes are now provided with electrical service outlets sometimes referred to as load centers which are permanent installations provided for each trailer or mobile home parking area so that electric current may be easily provided for each home or trailer. The load center provides electrical service outlets adapted to receive plugs on supply cables which are part of the equipment of the trailer or mobile home; and in order to correctly account for the amount of electricity used by each customer the load center includes an electric meter. Electrical controls such as circuit breakers may be provided in the service outlet box of the center.

Figure 1:
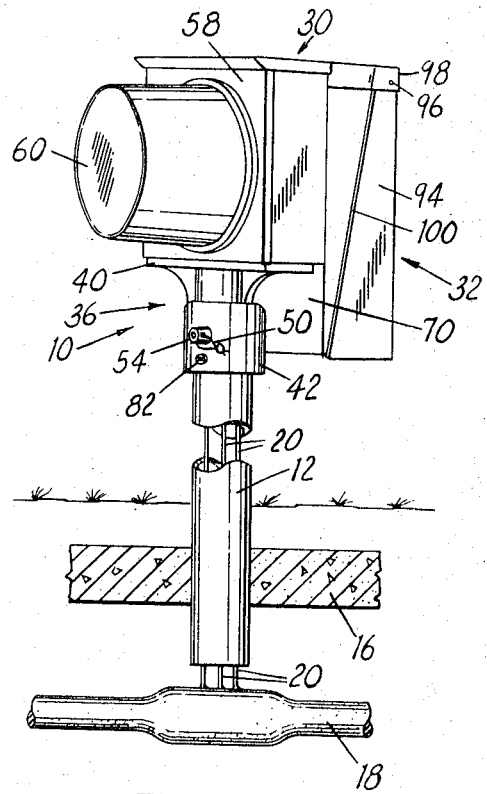
FIGURE 1 is a perspective view of the load center mounted on one form of pedestal.
Figure 2:
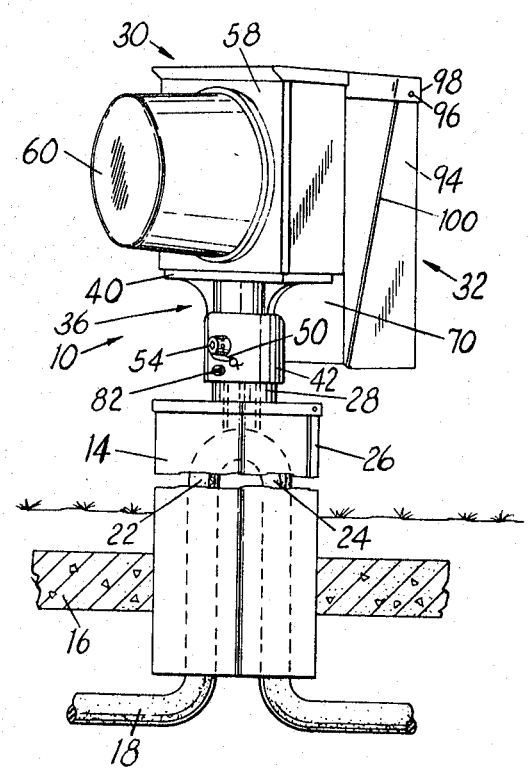
FIGURE 2 is a perspective view of the load center mounted on an alternative form of pedestal.
Figure 3:
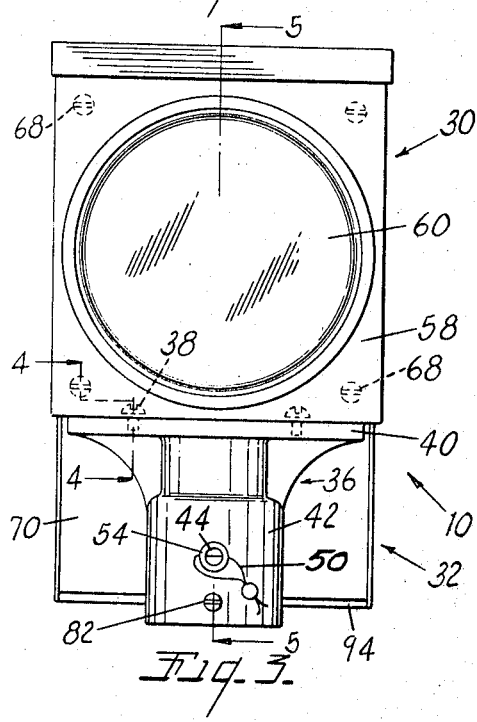
FIGURE 3 is a front elevational view of the load center viewed from the meter side.
Figure 4:
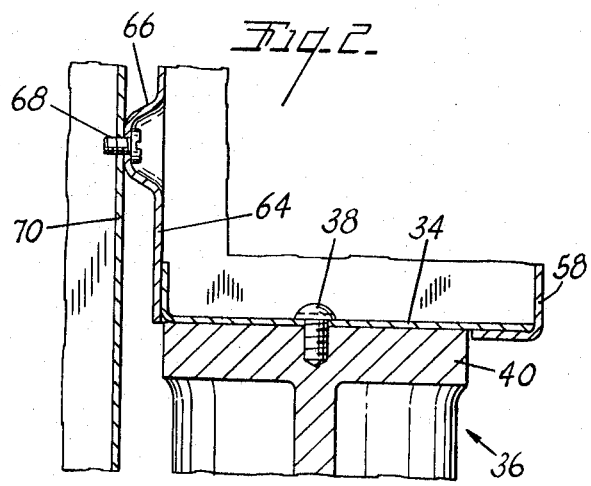
FIGURE 4 is a vertical cross sectional view taken along the line 4—4 in FIGURE 3.

FIGURE 1 illustrates the load center generally indicated at 10 mounted on a tubular pedestal or pipe 12. FIGURE 2 illustrates the same load center 10 mounted on a hollow pedestal 14 of generally rectangular cross section. The pedestals are permanently embedded in a block of concrete 16 poured in the ground and are supplied with electrical current from an electrical cable 18 which is buried in the ground underneath the pedestals. The pedestal of the load center shown in FIGURE 1 is adapted to be connected to the cable by what is known as a termination system in which three electrical conductors 20 are spliced into the cable below the pedestal and extend upwardly through a pipe 12. The installation shown in FIGURE 2 is known as a loop system in which the electrical cable extends upwardly into the hollow pedestal 14 as at 22 to a loop and a downwardly extending return length 24 so that the splices to the cable may be made above ground. For this purpose the side of the pedestal is provided with a door 26. The top of the pedestal 14 is provided with a short cylindrical neck 28 on its upper end which receives the load center and passes the individual conductors from the power cable in the same manner as the load center shown in FIGURE 1.

The load center consists of a meter socket box generally indicated at 30 and a service outlet box generally indicated at 32. The bottom 34 of the meter socket box is secured to a mounting hub generally indicated at 36 by means of screws 38 run downwardly through the bottom of the box into a flange 40 on the upper end of the hub 36. Thus access to the screws or fasteners 38 may not be had without opening the meter socket box. The lower cylindrical end 42 of the base 36 is interiorly shouldered and fits over the end of the pipe 12 in FIGURE 1 or the neck 28 in FIGURE 2. In order to prevent unauthorized tampering with the connection to the power wires between the pedestal and meter box, the cylinder 42 of the base is provided with a tapped hole 44 within which a short sealing screw 46 is threaded and engaged with the surface of the post or neck so as to prevent removal of the base from the pedestal. In order to prevent unauthorized release of the sealing screw 46, a second short locking screw 48 is threaded into the hole 44 and a mechanical tamper preventing sealing wire 50 is passed through a hole 52 extending transversely through a boss 54 surrounding the outer end of the hole 44.

The meter socket box 36 contains the usual meter socket elements such as the sockets 56 and connections thereto. A front cover 58 is adapted to support a glass closure 60 over the meter (not shown) in the well known construction of meter socket boxes. The cover 58 may be mechanically sealed by a tamper indicating seal (not illustrated) as is common. The back wall 64 of the meter socket box is provided with rearwardly offset projections 66 defining holes through which the connecting screws 68 are passed to connect the meter box to the service outlet box 32. The screws 68 are also accessible only from within the meter box so the boxes cannot be separated without breaking the mechanical seal and opening the front of the meter box. The screws 68 are tapped into the rear wall 70 of the service outlet box and hold the two boxes in closely spaced back to back relation.

The back wall 64 of the meter socket box and the wall 70 of the service outlet box define registering openings or holes 72 and 74 respectively and a tubular grommet 76 is desirably passed through these holes to act as a centering element for a deformable O-ring seal 78 which is compressed around the openings between the back walls of the boxes when the boxes are drawn together.

The service outlet box 32 projects below the bottom of the meter box alongside of the lower cylindrical portion 42 of the base 36 and a connecting screw 80 extends through the back wall 79 of the service box into the cylindrical base so that the outlet box is tied directly to the base as well as through the back wall 64 of the meter box. Below the box 54 and the mechanical seal 50, the cylindrical base 42 is provided with a secondary mechanical connecting and grounding screw 82 which is accessible at all times. This permits assurance of a good ground connection without breaking the mechanical seal 50 to check the condition of the clamping and grounding screw 46. The screw 82 also further tightens the base 36 on the pedestal 12 or the neck 28.

Wires 84 extend from the load side of the meter through the grommet 76 into the service outlet box as is common. A neutral wire is indicated at 86 and while this neutral wire is commonly ground in the meter box, an additional ground wire box at 88 may extend between the boxes and down through the pedestal to a separate ground. Within the service outlet box the wires 84, 86 and 88 are connected to the usual electrical control elements 90 such as fuses or circuit breakers and to electrical service outlets such as sockets 92 adapted to receive power lines or cables from the trailer or mobile home. No attempt has been made to illustrate the details of the circuit breakers or power outlets or the connections of the wires thereto as these parts and connections are standard and may be widely varied by persons skilled in the art.

In order to protect the outlet sockets and the connections within the service outlet box from the weather, a cover 94 is hinged to the top of the service outlet box at 96 with its upper edge below an overhanging flange 98. The cover has triangular side flanges 100 which close the sides of the box when the cover is swung outwardly to the dotted line position at 94A to permit the cables and wires to the trailer (not shown) to hang from the lower front edge of the outlet box.

What is claimed as new is:

1. A load center assembly for the electrical system of mobile homes comprising,
 a service outlet box having electrical supply and control fixtures mounted therein,
 a meter socket box connected to the back of said outlet box by fasteners accessible only from within the socket box,
 said boxes having registering openings of limited size formed in their connected walls,
 a socket for an electrical meter in said socket box, with wires connected to the metered side of said socket and extending through said openings and connected to said supply and control fixtures,
 a hollow mounting base connected to the bottom of said socket box by fasteners accessible only from within said socket box,
 said base communicating with said socket box,
 and a tamper proof mechanical connection on said base adapted to connect the base to a hollow support and enclosure for power distribution wires.

2. A load center assembly as defined in claim 1 in which there is an annular seal positioned around the openings in said boxes and engaged between the adjacent walls.

3. A load center assembly as defined in claim 1 in which said base is a hollow cylindrical member with a flange on one end with screws passed through the bottom of the socket box into said flange,
 the side of said cylindrical member having a lock screw therein engageable with the side of a pipe received in the lower end of the member,
 and means for attaching a tamper indicating mechanical seal over the end of said lock screw.

4. A load center assembly as defined in claim 3 in which the side of said cylindrical member has an interior downwardly facing shoulder adapted to rest on the top of a pipe,
 a boss on the outside of the member below said shoulder with a tapped hole extending through the boss to the inside of the member,
 and a short lock screw in said tapped hole,
 the outer end of said boss having a hole formed transversely therethrough to receive a tamper indicating wire seal in blocking relation over the outer end of said lock screw.

5. A load center assembly as defined in claim 4 in which there is a second short screw positioned in said tapped hole between said lock screw and the hole in said boss.

6. A load center assembly as defined in claim 3 in which there is an annular seal around said openings and between said boxes.

7. A load center assembly as defined in claim 6 in which there is a nipple extending through said openings, said annular seal being a deformable ring positioned around said nipple and between said boxes.

8. A load center assembly as defined in claim 6 in which said outlet box projects below the bottom of said socket box and alongside of said base,
 and a screw connecting the lower part of said outlet box to the side of said base.

References Cited

UNITED STATES PATENTS

| | | | |
|---|---|---|---|
| 2,423,938 | 7/1947 | Johansson | 317—111 XR |
| 2,907,928 | 10/1959 | Rutledge et al. | 317—109 |
| 3,247,337 | 4/1966 | Wiegel | 317—108 XR |

ROBERT K. SCHAEFER, *Primary Examiner.*

J. R. SCOTT, *Assistant Examiner.*